United States Patent
Chung

(10) Patent No.: US 8,519,776 B2
(45) Date of Patent: Aug. 27, 2013

(54) POWER CONVERTING APPARATUS AND METHOD OF SENSING OUTPUT CURRENT THEREOF

(75) Inventor: Younwoong Chung, Bucheon (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 320 days.

(21) Appl. No.: 13/106,717

(22) Filed: May 12, 2011

(65) Prior Publication Data

US 2012/0146598 A1 Jun. 14, 2012

(30) Foreign Application Priority Data

Dec. 13, 2010 (KR) .......................... 10-2010-0127183

(51) Int. Cl.
*G05F 1/10* (2006.01)
(52) U.S. Cl.
USPC .............................. 327/536; 323/285; 363/17
(58) Field of Classification Search
USPC ............... 363/16–17, 21.04, 21.05, 21.16, 363/21.17, 89, 97, 98, 79; 323/222, 224, 323/266, 267, 272, 275, 277, 282–289, 280, 323/281; 327/108, 110, 176, 423, 427, 536, 327/541
See application file for complete search history.

(56) References Cited

U.S. PATENT DOCUMENTS

| | | | | |
|---|---|---|---|---|
| 5,894,243 | A * | 4/1999 | Hwang | 327/540 |
| 6,147,478 | A * | 11/2000 | Skelton et al. | 323/288 |
| 6,198,639 | B1 * | 3/2001 | Wolfgart et al. | 363/21.15 |
| 7,336,122 | B2 | 2/2008 | Ko et al. | |
| 7,605,574 | B2 * | 10/2009 | Dearn et al. | 323/284 |
| 2010/0026253 | A1 * | 2/2010 | Wang | 323/276 |

* cited by examiner

*Primary Examiner* — Rajnikant Patel
(74) *Attorney, Agent, or Firm* — Okamoto & Benedicto LLP

(57) ABSTRACT

A power converting apparatus includes a power converter, a first resistor, a second resistor, a current controller, a voltage sensor, a sample/holder, and a switch controller. The power converter converts an input voltage into an output voltage. The first resistor is connected to an output of the power converter, and the second resistor is connected to the first resistor. The current controller controls a first current to make the first current that is less than a second current flowing in the first resistor flow in the second resistor, and outputs a third current corresponding to the first current. The voltage sensor senses a first voltage corresponding to the third current. The sample/holder samples the first voltage, and outputs the sampled voltage. The switch controller controls an operation of the power converter based on a voltage output from the sample/holder.

20 Claims, 5 Drawing Sheets

POWER CONVERTING APPARATUS AND METHOD OF SENSING OUTPUT CURRENT THEREOF

CROSS-REFERENCE TO RELATED APPLICATION

This application claims priority to and the benefit of Korean Patent Application No. 10-2010-0127183 filed in the Korean Intellectual Property Office on Dec. 13, 2010, the entire contents of which are incorporated herein by reference.

BACKGROUND (a) Field

Embodiments of the present invention relate to a power converting apparatus and a method of sensing output current thereof.

(b) Description of the Related Art

A power converting apparatus converts an input voltage to an output voltage. One example of the power converting apparatus is a circuit for converting the input voltage to the output voltage by alternately turning on and turning off a switch. In this case, the switch is turned on such that energy is charged to an inductor by the input voltage, and the switch is turned off such that the output voltage is generated by the energy charged to the inductor. The output voltage may be determined by a duty ratio of the switch.

The power converting apparatus controls a switching operation of the switch in accordance with a current flowing to an output terminal, and includes a circuit for sensing the current flowing to the output terminal. When the output voltage of the power converting apparatus is a high voltage, high voltage devices should be used in the circuit. However, the high voltage devices are difficult to mount on a semiconductor device because of their large size, and manufacturing cost is increased by the high voltage devices.

The above information disclosed in this Background section is only for enhancement of understanding of the background of the invention and therefore it may contain information that does not form the prior art that is already known in this country to a person of ordinary skill in the art.

SUMMARY

Embodiments of the present invention provide a power converting apparatus and a method of sensing an output current of the power converting apparatus that can sense an output current using low voltage devices.

A power converting apparatus according to an embodiment of the present invention includes a power converter, a first resistor, a second resistor, a current controller, a voltage sensor, a sample/holder, and a switch controller. The power converter converts an input voltage into an output voltage. The first resistor is connected to an output of the power converter, and the second resistor is connected to the first resistor. The current controller controls a first current to make the first current that is less than a second current flowing in the first resistor flow in the second resistor, and outputs a third current corresponding to the first current. The voltage sensor senses a first voltage corresponding to the third current. The sample/holder samples the first voltage, and outputs the sampled voltage. The switch controller controls an operation of the power converter based on a voltage output from the sample/holder.

The third current may be equal to the first current. The power converter may further include a power storing unit configured to receive the input voltage, an output unit configured to output the output voltage, and a switching unit configured to control a connection between the power storing unit and the output unit. The power storing unit may store power according to the input voltage while the switching unit blocks the power storing unit from the output unit, and the output unit may generate the output voltage from the power stored to the power storing unit while the switching unit connects the power storing unit to the output unit.

The sample/holder may sample the first voltage while the switching unit blocks the power storing unit from the output unit, and output the sampled voltage while the switching unit connects the power storing unit to the output unit.

The switching unit may control the connection between the power storing unit and the output unit in response to a control signal from the switch controller, and the sample/holder may sample the first voltage or outputs the sampled voltage in response to the control signal.

The first resistor may have a first terminal connected to the output unit, and a second terminal. The second resistor may have a first terminal connected to the second terminal of the first resistor, and a second terminal. The current controller may include a comparator having a first input terminal connected to the first terminal of the first resistor, a second input terminal connected to the second terminal of the second resistor, and an output terminal, and a transistor having an input terminal connected to the second terminal of the second resistor, a control terminal connected to the output terminal of the comparator, and an output terminal connected to the voltage sensor. The third current may flow in the transistor.

The second resistor may have greater resistance than the first resistor.

The first input terminal may be a positive input terminal, and the second input terminal may be a negative input terminal. The transistor may be a p-channel transistor, and the input terminal, the control terminal, and the output terminal of the transistor correspond to a source, a gate, and a drain, respectively.

The voltage sensor may include a third resistor connected between the output terminal of the transistor and a predetermined voltage terminal.

The second terminal of the first resistor may be further connected to a ground terminal.

The power storing unit may include an inductor having a first terminal connected to the input voltage, and a second terminal. The switching unit may include a diode having an anode connected between the second terminal of the inductor, and a cathode, and a switch connected between the second terminal of the inductor and a ground terminal. The output unit may include a capacitor connected between the cathode of the diode and the first resistor.

The power storing unit may be blocked from the output unit when the switch is turned on, and the power storing unit may be connected to the output unit when the switch is turned off.

According to another embodiment of the present invention, a method of sensing an output current flowing in an output unit of a power converting apparatus is provided. The method includes storing power according to an input voltage while the input voltage is blocked from the output unit, and generating an output voltage of the output unit based on the stored power. Storing the power includes generating a first current that is less than the output current flowing in the output unit, sensing a voltage according to a second current corresponding to the first current, and sampling the sensed voltage. Generating the output voltage includes outputting the sampled voltage, and controlling an operation of the power converting apparatus based on the sampled voltage.

A power converting apparatus according to yet another embodiment of the present invention includes a power converter, first to third resistors, a comparator, a transistor, a sample/holder, and a switch controller. The power converter includes a capacitor, and converts an input voltage into an output voltage to store the output voltage to the capacitor The first resistor has a first terminal connected to the capacitor, and a second terminal. The second resistor has a first terminal connected to the second terminal of the first resistor, and a second terminal. The comparator has a first input terminal connected to the first terminal of the first resistor, a second input terminal connected to the second terminal of the second resistor, and an output terminal. The transistor has a control terminal connected to the output terminal of the comparator, an input terminal connected to the second terminal of the second resistor, and an output terminal. The third resistor is connected to the output terminal of the transistor. The sample/holder samples a voltage of the third resistor, and outputs the sampled voltage. The switch controller controls an operation of the power converter based on a voltage output from the sample/holder.

DETAILED DESCRIPTION OF THE EMBODIMENTS

Figure 1:
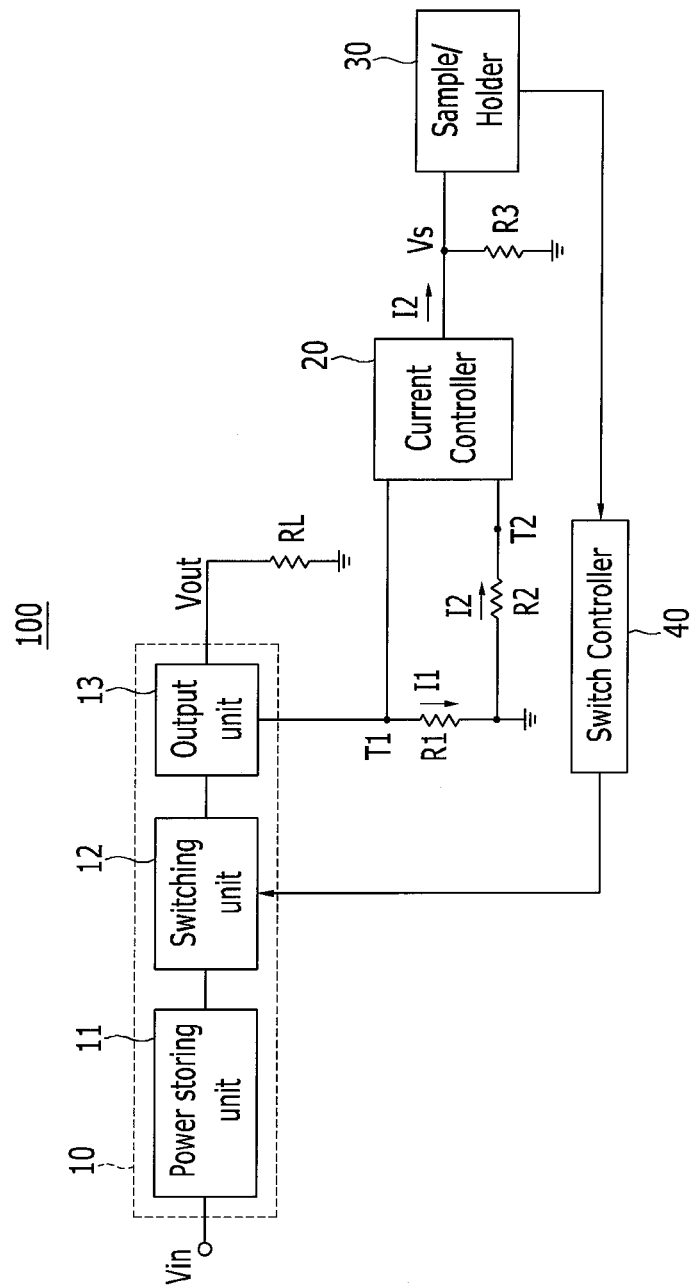
FIG. 1 is a schematic diagram of a power converting apparatus according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "connected" to another element, the element may be "directly connected" to the other element or "electrically connected" to the other element through a third element.

FIG. 1 is a schematic diagram of a power converting apparatus according to an exemplary embodiment of the present invention.

Referring to FIG. 1, a power converting apparatus 100, by way of a non-limiting example, includes a power converter 10, resistors R1, R2, and R3, a current controller 20, a sample/holder 30, and a switch controller 40. The power converter 10 includes a power storing unit 11, a switching unit 12, and an output unit 13.

The power storing unit 11 stores power corresponding to an input voltage Vin when the switching unit 12 blocks an electric connection between the power storing unit 11 and the output unit 13. When the switching unit 12 connects the power storing unit 11 to the output unit 13, the output unit 13 generates and stores an output voltage Vout based on the power stored in the power storing unit 11, and outputs the output voltage Vout to an output terminal. A load of the power converting apparatus 100 is connected to the output terminal, and an equivalent circuit of the load may be represented as a resistor RL. Since a current flowing in the output unit 13 is substantially equal to a current flowing in the load RL when the power storing unit 11 is blocked from the output unit 13, the current flowing in the load RL can be sensed through the current flowing in the output unit 13.

The resistor R1 has one terminal connected to the output unit 13 and the other terminal connected to the ground terminal, and senses a current I1 flowing in the output unit 13. The resistor R2 has a greater resistance than the resistor R1, and is connected to the resistor R1 such that a current that is less than the current I1 flowing in the resistor R1 flows in the resistor R2. For example, as shown in FIG. 1, one terminal T2 of the resistor R2 is connected to the current controller 20, and the other terminal of the resistor R2 is connected to the other terminal of the resistor R1, i.e., the ground terminal.

The current controller 20 is connected to the resistors R1 and R2 and allows the current that is less than the current I1 flowing in the resistor R1 to flow in the resistor R2. The current controller 20 transfers a current corresponding to the current I2 flowing in the resistor R2, for example, a current I2 having the same magnitude as the current I2 flowing in the resistor R2, to the resistor R3.

The resistor R3 operates as a current sensor for sensing the current I2 and outputting a voltage Vs corresponding to the sensed current. The sample/holder 30 samples the voltage Vs applied to the resistor R3, and outputs the sampled voltage Vs. Sampling/holding timing of the sample/holder 30 may be set to be the same as on/off timing of the switching unit 12. Then, the sample/holder 30 samples the voltage Vs applied to the resistor R3 and stores the sampled voltage when the power storing unit 11 is blocked from the output unit 13 by the switching unit 12. The sample/holder 30 holds, i.e., outputs, the stored voltage Vs when the power storing unit 11 is connected to the output unit 13 by the switching unit 12.

The switch controller 40 controls operation of the switching unit 12 based on the voltage Vs output from the sample/holder 30.

As described above, according to an embodiment of the present invention, the output current I1 is sensed by the current I2 which is less than the output current flowing in the load RL while the electric connection is blocked between the power storing unit 11 and the output unit 13. Therefore, the output current I1 can be sensed without using the high voltage devices.

Next, one example of the power converter 10 shown in FIG. 1 will be described with reference to FIG. 2 to FIG. 4.

Figure 2:
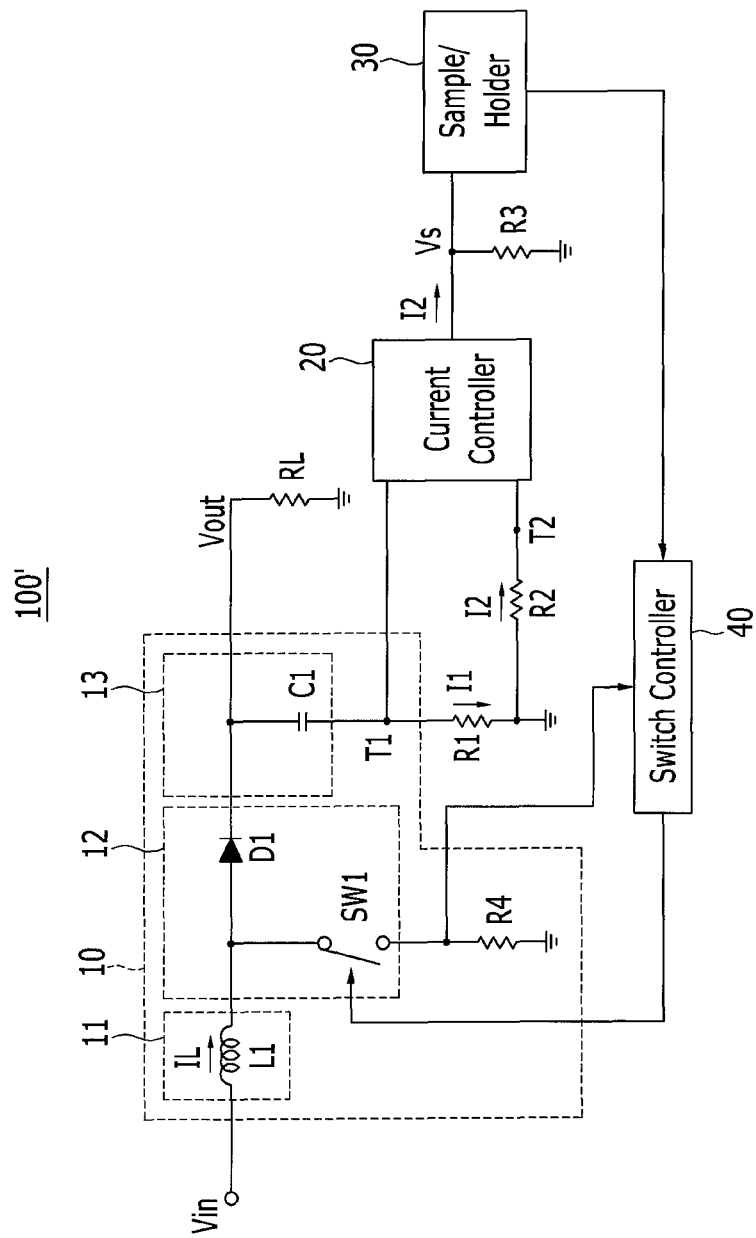
FIG. 2 and FIG. 5 are schematic diagrams of examples of a power converting apparatus according to embodiments of the present invention, respectively.

FIG. 2 is a schematic diagram of one example of a power converting apparatus 100' according to an embodiment of the present invention. FIG. 3 and FIG. 4 are schematic diagrams showing an operation of a power converter, respectively.

Referring to FIG. 2, a boost converter of a direct current to direct current (DC-DC) converter may be used as one example of a power converter 10.

In detail, a power storing unit 11 includes an inductor L1, a switching unit 12 includes a switch SW1 and a diode D1, and an output unit 13 includes a capacitor C1.

The inductor L1 has one terminal connected to an input voltage Vin and the other terminal connected to an anode of the diode D1 and one terminal of the switch SW1. A cathode of the diode D1 is connected to one terminal of the capacitor C1, and the other terminal of the capacitor C1 is connected to the ground terminal via a resistor R1. The other terminal of the switch SW1 is connected to the ground terminal. A resistor R4 may be further connected between the other terminal of the switch SW1 and the ground terminal.

Figure 3:
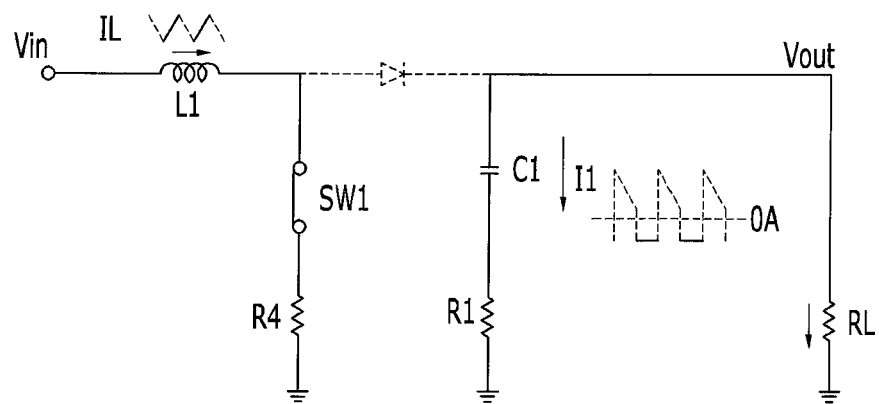
FIG. 3 and FIG. 4 are schematic diagrams showing an operation of a power converter, respectively.

Referring to FIG. 3, when the switch SW1 is turned on, a current flows from the input voltage Vin to the ground terminal via the inductor L1 and the switch SW1 such that a current IL flowing in inductor L1 is linearly increased. In this case, the diode D1 blocks the power storing unit 11 from the output unit 13.

Figure 4:
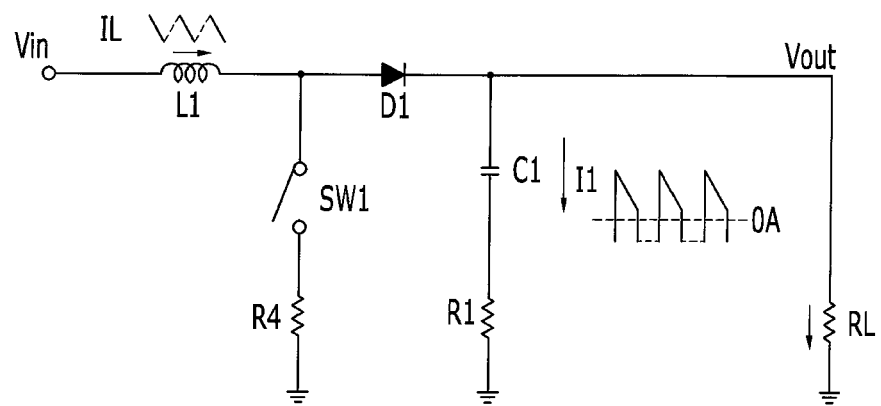

Referring to FIG. 4, when the switch SW1 is turned off, a voltage of the capacitor C1 is charged by the current IL flowing in the inductor L1, i.e., energy stored to the power storing unit 10, such that the input voltage Vin is converted into an output voltage Vout. Accordingly, the current IL flowing in the inductor L1 and a current I1 flowing in the capacitor C1 are linearly decreased. The output voltage Vout is determined by a duty ratio of the switch SW1.

When the switch SW1 is turned on, as shown in FIG. 3, the current I1 flows from the capacitor C1 to the load RL in the output unit 13 by the voltage stored to the capacitor C1. A resistor R3, i.e., a current sensor, senses a current I2 corresponding to the current I1 flowing in the load RL when the switch SW1 is turned on.

Next, one example of the current controller 20 shown in FIG. 1 will be described with reference to FIG. 5.

Figure 5:
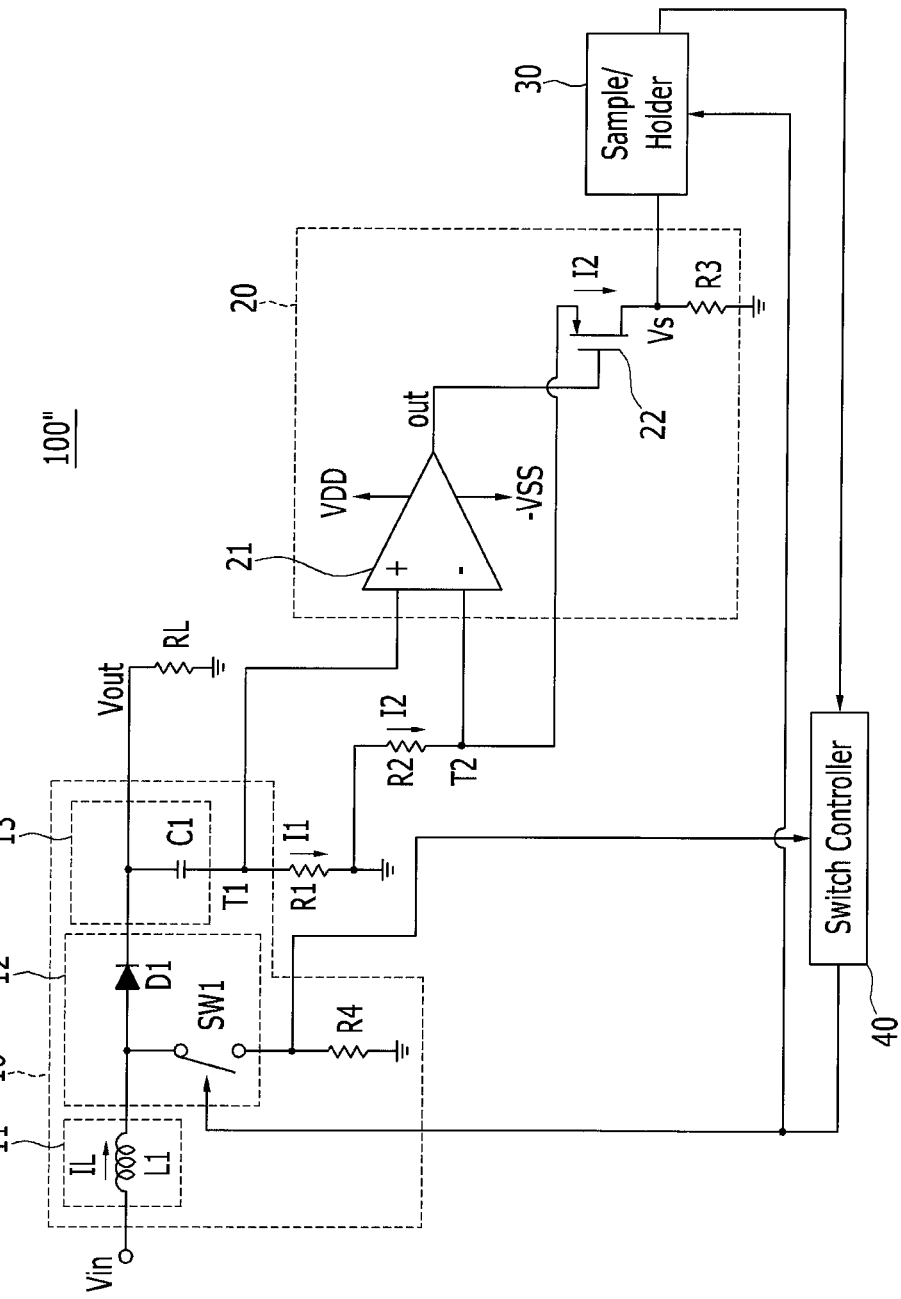

FIG. 5 is a schematic diagram of one example of a power converting apparatus 100" according to an embodiment of the present invention.

Referring to FIG. 5, one example of a current controller 20 includes a comparator 21 and a transistor 22.

The comparator 21 has a positive input terminal (+), a negative input terminal (−), and an output terminal out, and may be configured as an operational amplifier (OPAMP). The positive input terminal (+) is connected to one terminal T1 of a resistor R1, the negative input terminal (−) is connected to one terminal T2 of a resistor R2, and the output terminal out is connected to a control terminal of the transistor 22. A positive voltage VDD and a negative voltage −VSS may be used as operating voltages of the comparator 21.

An input terminal of the transistor 22 is connected to one terminal of the resistor R2, i.e., a contact point of the resistor R2 and the negative input terminal (−) of the comparator 21, and an output terminal of the transistor 22 is connected to a resistor R3. While the transistor 22 has been depicted as a p-channel metal-oxide semiconductor field-effect transistor (MOSFET), another type of transistor may be used as the transistor 22. When the transistor 22 is the p-channel MOSFET, the input terminal, the output terminal, and the control terminal of the transistor 22 are a source, a drain and a gate, respectively.

When a switching unit 12 blocks a power storing unit 11 from an output unit 13, a current I1 flows in the resistor R1 in a direction from the ground terminal to a capacitor C1 by a voltage charged to the output unit 13, i.e., the capacitor C1. Accordingly, a negative voltage V1 is applied to one terminal T1 of the resistor R1. Then, a voltage V2 that is equal to the voltage V1 is applied to one terminal T2 of the resistor R2 by a regulation operation of the comparator 21 and the transistor 22. As a result, a current I2 having a magnitude of (R1/R2)*I1 flows in the resistor R2.

That is, the current controller 20 operates as a regulator for making the voltages V1 and V2 of the resistors R1 and R2 be the same.

The sample/holder 30 samples a voltage Vs applied to the resistor R3, i.e., ((R1*R3)/R2)*I1). When a resistance of the resistor R2 is set to be greater than that of the resistor R1, the current I2 becomes less than the current I1. Accordingly, the sample/holder 30 can sample the low voltage Vs, so the sample/holder 30 can be configured by low voltage devices.

Since the sample/holder 30 operates when the switching unit 12 blocks the power storing unit 11 from the output unit 13, a control signal for controlling the switching unit 12 may be used as a control signal for selecting a sampling operation or a holding operation of the sample/holder 30. In detail, a control signal S1 that a switch controller 40 outputs to a control terminal of a switch SW1 of the switching unit 12 is transferred to the sample/holder 30. In this case, the sample/holder 30 samples the voltage Vs in response to one level, for example a level for turning on the switch SW1, of the control signal S1, and outputs the sample voltage Vs in response to the other level, for example a level for turning off the switch SW1, of the control signal S2.

The switch controller 40 may generate the control signal S1 for controlling the switch SW1 based on the output voltage Vs of the sample/holder 30. That is, the switch controller 40 may control a duty ratio of the control signal S1. In some embodiments, the switch controller 40 may sense a current flowing in the switch SW1 by a resistor R4, and generate the control signal S1 based on a voltage applied to the resistor R4 and the output voltage Vs of the sample/holder 30.

As described above, according to an embodiment of the present invention, a power converting apparatus can sense an output current of an output unit by a current that is less than the output current, thereby using low voltage devices to sense the output current. Further, the power converting apparatus using the low voltage devices can be easily mounted on a semiconductor device and be manufactured with a low cost.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A power converting apparatus, comprising:
   a power converter configured to convert an input voltage into an output voltage;
   a first resistor connected to an output of the power converter;
   a second resistor connected to the first resistor;
   a current controller configured to control a first current to make the first current that is less than a second current flowing in the first resistor flow in the second resistor, and to output a third current corresponding to the first current;
   a voltage sensor configured to sense a first voltage corresponding to the third current;
   a sample/holder configured to sample the first voltage, and to output the sampled voltage; and
   a switch controller configured to control operation of the power converter based on a voltage output from the sample/holder.

2. The apparatus of claim 1, wherein the third current is equal to the first current.

3. The apparatus of claim 1, wherein the power converter comprises:
   a power storing unit configured to receive the input voltage;
   an output unit configured to output the output voltage; and
   a switching unit configured to control a connection between the power storing unit and the output unit,
   wherein the power storing unit stores power according to the input voltage while the switching unit blocks the power storing unit from the output unit, and the output unit generates the output voltage from the power stored to the power storing unit while the switching unit connects the power storing unit to the output unit.

4. The apparatus of claim 3, wherein the sample/holder samples the first voltage while the switching unit blocks the power storing unit from the output unit, and outputs the sampled voltage while the switching unit connects the power storing unit to the output unit.

5. The apparatus of claim 3, wherein the switching unit controls the connection between the power storing unit and the output unit in response to a control signal from the switch controller, and
the sample/holder samples the first voltage or outputs the sampled voltage in response to the control signal.

6. The apparatus of claim 3, wherein the first resistor has a first terminal connected to the output unit, and a second terminal, and
the second resistor has a first terminal connected to the second terminal of the first resistor, and a second terminal,
wherein the current controller comprises:
a comparator having a first input terminal connected to the first terminal of the first resistor, a second input terminal connected to the second terminal of the second resistor, and an output terminal; and
a transistor having an input terminal connected to the second terminal of the second resistor, a control terminal connected to the output terminal of the comparator, and an output terminal connected to the voltage sensor,
wherein the third current flows in the transistor.

7. The apparatus of claim 6, wherein the second resistor has greater resistance than the first resistor.

8. The apparatus of claim 6, wherein the first input terminal is a positive input terminal and the second input terminal is a negative input terminal, and
wherein the transistor is a p-channel transistor, and the input terminal, the control terminal, and the output terminal of the transistor correspond to a source, a gate, and a drain, respectively.

9. The apparatus of claim 6, wherein the voltage sensor comprises a third resistor connected between the output terminal of the transistor and a predetermined voltage terminal.

10. The apparatus of claim 6, wherein the second terminal of the first resistor is further connected to a ground terminal.

11. The apparatus of claim 3, wherein the power storing unit comprises an inductor having a first terminal connected to the input voltage, and a second terminal,
the switching unit comprises a diode having an anode connected between the second terminal of the inductor, and a cathode, and a switch connected between the second terminal of the inductor and a ground terminal,
wherein the output unit comprises a capacitor connected between the cathode of the diode and the first resistor.

12. The apparatus of claim 11, wherein the power storing unit is blocked from the output unit when the switch is turned on, and the power storing unit is connected to the output unit when the switch is turned off.

13. A method of sensing an output current flowing in an output unit of a power converting apparatus, the method comprising:
storing power according to an input voltage while the input voltage is blocked from the output unit; and
generating an output voltage of the output unit based on the stored power, and
wherein storing the power comprises:
generating a first current that is less than the output current flowing in the output unit;
sensing a voltage according to a second current corresponding to the first current; and
sampling the sensed voltage,
wherein generating the output voltage comprises:
outputting the sampled voltage; and
controlling an operation of the power converting apparatus based on the sampled voltage.

14. The method of claim 13, wherein the power converting apparatus includes a first resistor having a first terminal connected to the output unit and a second terminal, and a second resistor having a first terminal connected to the second terminal of the first resistor and a second terminal, and
generating the first current comprises:
regulating a voltage of the second terminal of the second resistor to be equal to a voltage of the first terminal of the first resistor; and
generating the first current from a current flowing in the second resistor.

15. The method of claim 14, wherein the third current is equal to the second current.

16. The method of claim 15, wherein the power converting apparatus further includes an inductor, and the output unit includes a capacitor,
wherein storing the power further comprises providing a current to the inductor from the input voltage to store the power to the inductor, and
wherein generating the output voltage further comprises storing the output voltage to the capacitor with a current flowing in the inductor.

17. A power converting apparatus, comprising:
a power converter including a capacitor, and configured to convert an input voltage into an output voltage to store the output voltage to the capacitor;
a first resistor having a first terminal connected to the capacitor, and a second terminal;
a second resistor having a first terminal connected to the second terminal of the first resistor, and a second terminal;
a comparator having a first input terminal connected to the first terminal of the first resistor, a second input terminal connected to the second terminal of the second resistor, and an output terminal;
a transistor having a control terminal connected to the output terminal of the comparator, an input terminal connected to the second terminal of the second resistor, and an output terminal;
a third resistor connected to the output terminal of the transistor;
a sample/holder configured to sample a voltage of the third resistor, and to output the sampled voltage; and
a switch controller configured to control an operation of the power converter based on a voltage output from the sample/holder.

18. The apparatus of claim 17, wherein the second resistor has greater resistance than the first resistor.

19. The apparatus of claim 17, wherein the second terminal of the first resistor is further connected to a ground terminal.

20. The apparatus of claim 17, wherein the first input terminal is a positive input terminal, and the second input terminal is a negative input terminal, and
wherein the transistor is a p-channel transistor, and the input terminal, the control terminal, and the output terminal of the transistor correspond to a source, a gate, and a drain, respectively.

* * * * *